June 2, 1925.  
J. C. TUTTLE ET AL  
COLLAPSIBLE CORE  
Filed April 21, 1920
1,539,923
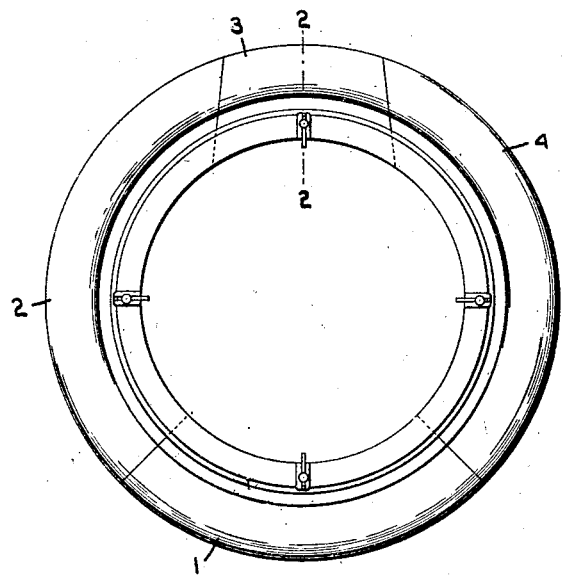
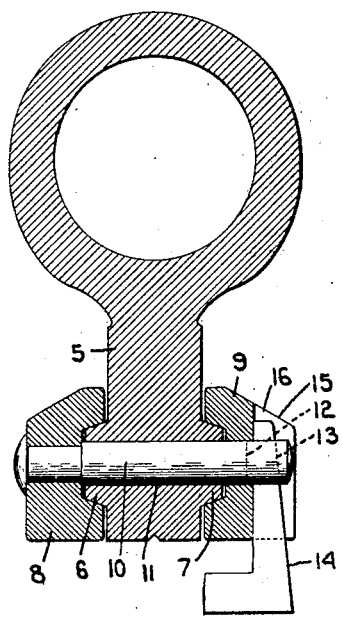
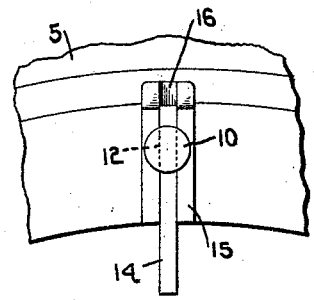
Inventors.  
John C. Tuttle  
Frederick A. Bollinger  
by G. R. Ely Atty.

Patented June 2, 1925.

1,539,923

UNITED STATES PATENT OFFICE.

JOHN C. TUTTLE AND FREDERICK A. BOLLINGER, OF AKRON, OHIO, ASSIGNORS TO THE FIRESTONE TIRE AND RUBBER COMPANY, OF AKRON, OHIO, A CORPORATION OF OHIO.

COLLAPSIBLE CORE.

Application filed April 21, 1920. Serial No. 375,474.

*To all whom it may concern:*

Be it known that we, JOHN C. TUTTLE and FREDERICK A. BOLLINGER, residing at Akron, in the county of Summit and State of Ohio, have invented certain new and useful Improvements in Collapsible Cores, of which the following is a specification.

This invention relates to collapsible cores used in the manufacture of pneumatic tires upon which the outer casings or carcasses are built, and has for its principal object the provision of a locking means for securely locking the several arcuate sectors together, that will allow the cores to be assembled or disassembled with great facility, dispensing with the loose bolts and nuts frequently used in holding the locking rings in place.

A further object is to devise a means for locking the customary clamping means in place which shall be easy and quick in operation and will securely clamp the several core sections in proper alinement when assembled.

These and other objects of our invention will appear more fully in the accompanying description and be especially pointed out in the claims.

In the drawings:

Fig. 1 is a side elevation of a collapsible core embodying our invention.

Fig. 2 is an enlarged cross sectional view taken on line 2—2, Fig. 1.

Fig. 3 is an enlarged view in elevation of the locking member and clamping rings embodied in our invention.

Customarily the core embodying this invention is composed of several arcuate sections that when assembled form an annulus. The sections are so constructed that at least one of them may be moved inwardly, thus permitting the other sections to be collapsed after the locking means, hereinafter described, is released, when it is desired to remove the core from the tire carcass formed thereon. These sections are designated in the drawings by numerals 1, 2, 3, and 4, of which 3 is shown as the key section which may be removed when the carcass is finished. The tongue portion 5 of each of the sections is provided with segmental ribs which, when the core is assembled, form annular ribs on each side of the core. These ribs 6 and 7 are for the purpose of receiving locking rings 8 and 9 and are shown in cross section as being made with tapering sides. The rings have corresponding tapered channels that fit over the ribs and hold the several sections in correct alinement when they are forced together by the locking rings.

The locking means illustrated in the drawings consists of pins or studs 10, which may be conveniently spaced equidistantly about the core, adapted to pass through suitable apertures 11 provided in the tongue sections of the core. One end of the pins 10 is irremovably secured in the ring 8, thus eliminating the risk of lost parts and keeping the pins always in this desired position. The other ends of the pins, which are adapted to pass through the ring 9, are formed with slotted apertures 12, the outer side of each of which is tapered as at 13. Wedges, or cam elements, 14 are designed to work in the slots 12, and when driven between the tapered surface 13 and the outer face of the ring 9, they lock the clamping rings 8 and 9 firmly over the several core sections.

The ring 9 has bosses 15 integral thereon, at the places through which the pins 10 project in which grooves 16 are formed, said grooves are for the purpose of guiding the wedges 14 into the slots 12. It will be readily seen that the construction described is simple, cheap, thoroughly durable, and easily manipulated. The wedge 14 automatically takes care of the wear and loose play that comes from hard usage and permits the rings to be always locked tightly together over the inner edge of the core, it being necessary to give the wedges only a slight tap with a hammer.

To assemble a core, first the several arcuate sections are placed on the ring 8, the pins 10 projecting through the holes 11 in the core sections. The groove in the ring 8 fits over the annular rib formed on the adjacent side of the core and correctly positions the sections in the proper alinement. The second ring 9 is then placed over the projecting ends of the pins and the wedges are guided into the slots 12 by the grooves 16 formed in the ring 9. Each wedge is given a tap with a hammer thereby locking the rings to the sides of the core. The core is then ready to have a tire built thereon. To disassemble, the wedges are knocked from the ring 9, thus freeing the clamping rings, and the ring 9 is removed first and then the ring 8 with the pins 10 is withdrawn from the core. The core may then be collapsed and removed from the finished tire carcass.

The foregoing detailed description has been given for clearness of understanding only and no unnecessary limitation should be understood therefrom, many changes in form and construction may be made without departing from the spirit of the invention within the scope of the appended claims.

We claim:

1. In a collapsible core, the combination of separable sections having inwardly extending tongues, locking rings adapted to lie on each side of said tongues, clamping means irremovably secured to one of said ring and passing through said tongues and the other of said rings said means being provided with a tapered surface, and a wedge adapted to cooperate with said surface.

2. A collapsible core comprising a plurality of separable sections, locking rings for holding the sections together, and means to draw the rings together to clamp the core in assembled relation, said means being irremovably secured to one of said rings, and a wedge adapted to cooperate with said means.

3. A collapsible core in combination with a pair of locking rings, locking means for forcing the rings together, said means being secured to one of said rings and passing through the other ring, a wedge constructed to cooperate with said locking means, and a groove on said latter named ring to guide the wedge to said locking means.

JOHN C. TUTTLE.
FREDERICK A. BOLLINGER.